No. 615,437. Patented Dec. 6, 1898.
G. W. DILLON.
SOAKING BOOT FOR HORSES.
(Application filed Sept. 28, 1898.)
(No Model.)
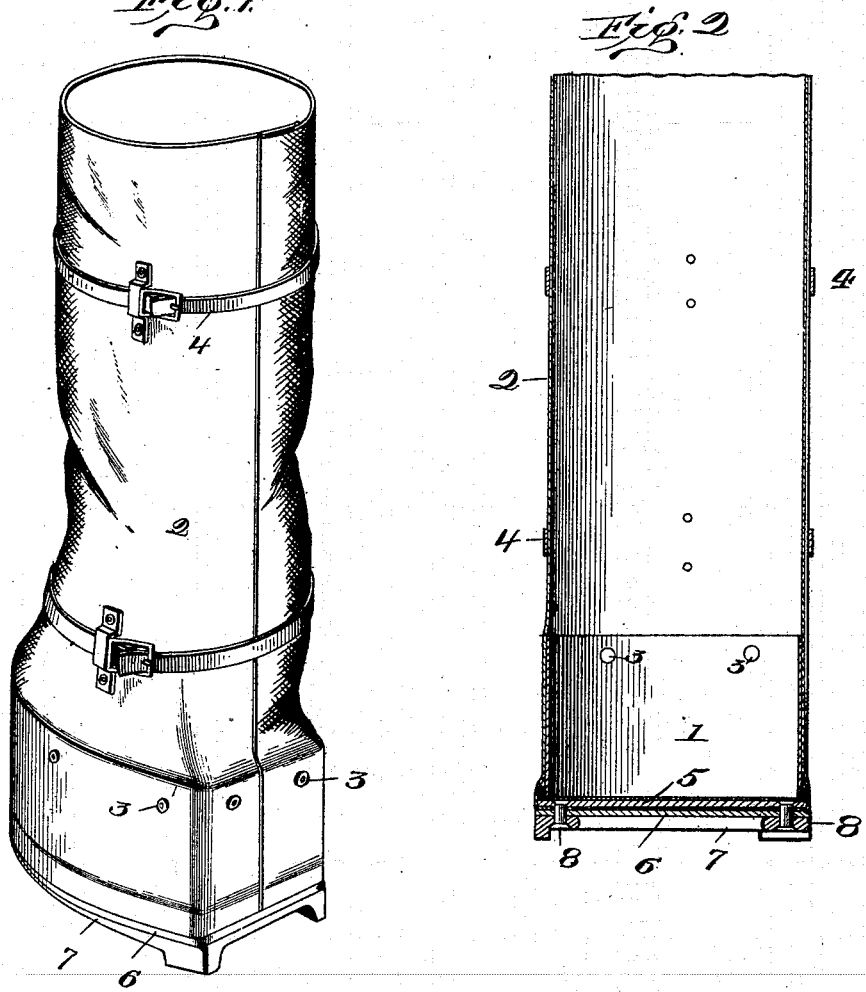

UNITED STATES PATENT OFFICE.

GRANVILLE W. DILLON, OF ORWELL, OHIO.

SOAKING-BOOT FOR HORSES.

SPECIFICATION forming part of Letters Patent No. 615,437, dated December 6, 1898.

Application filed September 28, 1898. Serial No. 692,106. (No model.)

*To all whom it may concern:*

Be it known that I, GRANVILLE W. DILLON, a citizen of the United States, residing at Orwell, in the county of Ashtabula and State of Ohio, have invented certain new and useful Improvements in Soaking-Boots; and I do hereby declare the following to be a full, clear, and exact description of the same, reference being had to the accompanying drawings, forming a part of this specification, and to the figures of reference marked thereon.

This invention relates to improvements in horse-boots, and especially to that kind known as "soaking-boots," which are adapted to contain a medicament for the treatment of the horse's hoof and which are to be attached to the horse's leg; and the invention consists in certain novel details of construction and combinations and arrangements of parts, all of which will be now described, and the particular features of novelty pointed out in the appended claims.

In the accompanying drawings, Figure 1 is a perspective view showing a boot embodying the present invention. Fig. 2 is a longitudinal section.

Similar figures of reference in both views indicate the same parts.

As is well known, the hoofs of a horse that is kept much in the stable become hard and dry, contract, and the horse goes lame. It is the object of this invention to provide a boot that may be worn by the horse to contain a medicament for the softening of the hoofs that have become hard and brittle.

In the accompanying drawings, illustrating a practical embodiment of the invention, the numeral 1 indicates a pan or receptacle, of zinc or other metal, fashioned substantially to the shape of a horse's hoof, and in which the medicament is to be placed. This pan is enveloped by an outer casing or cover 2, of leather, which is secured to the pan by rivets 3, the casing extending up above the pan to envelop the leg of the horse and provided with fastening means, such as straps 4, for securing the boot in place. Between the pan 1 and the bottom of the casing is a plate 5, of metal, which forms a support for the pan and prevents it being bent out of shape by the weight of the horse. On the outside of the casing 2 there is a finishing-piece 6, of any suitable material, preferably leather, extending over the bottom of the boot, and to the bottom of the boot is secured a bar-shoe 7 by means of rivets 8. These rivets, it will be noted, pass through the shoe, finishing-piece, inner metal plate 5, and inturned edges of casing 2, thus securing these parts together.

By having the shoe on the bottom of the boot the boot will be prevented from wearing.

The device, it will be noted, is simple and strong and can be readily and easily attached to the horse's leg.

Having thus described my invention, what I claim as new is—

1. In a soaking-boot, the combination with the casing of the pan or receptacle within the boot, the metal plate between the pan and bottom of the boot, and the bar-shoe; substantially as described.

2. In a soaking-boot, the combination with the boot or casing, the pan or receptacle within the boot, the metal plate between the pan and bottom of the boot, the finishing-piece on the outside of the bottom of the boot, the bar-shoe, and rivets passing through the shoe, finishing-piece and metal plate for securing these parts together; substantially as described.

GRANVILLE W. DILLON.

Witnesses:
R. E. STONE,
W. Y. DILLON.